(12) United States Patent
Watanabe et al.

(10) Patent No.: US 7,372,500 B2
(45) Date of Patent: May 13, 2008

(54) IMAGE SIGNAL PROCESSOR FOR USE WITH A SOLID-STATE IMAGING DEVICE

(75) Inventors: Tohru Watanabe, Ogaki (JP); Takashi Tanimoto, Gifu-ken (JP); Tatsuya Takahashi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 692 days.

(21) Appl. No.: 10/208,341

(22) Filed: Jul. 30, 2002

(65) Prior Publication Data

US 2003/0026614 A1    Feb. 6, 2003

(30) Foreign Application Priority Data

Aug. 1, 2001   (JP) .............................. 2001-233807
Apr. 11, 2002  (JP) .............................. 2002-109417

(51) Int. Cl.
  H04N 5/225   (2006.01)
  H04N 3/14    (2006.01)

(52) U.S. Cl. ........................ 348/372; 348/311; 323/351
(58) Field of Classification Search ................ 348/372, 348/311
  See application file for complete search history.

(56) References Cited

U.S. PATENT DOCUMENTS

| 5,493,409 | A | | 2/1996 | Maeda et al. | |
|---|---|---|---|---|---|
| 5,963,255 | A | * | 10/1999 | Anderson et al. | ............ 348/372 |
| 6,023,539 | A | * | 2/2000 | Ohnami et al. | ............. 382/317 |
| 6,078,210 | A | | 6/2000 | Uchida et al. | |
| 6,236,262 | B1 | | 5/2001 | Mellot | |
| 6,377,073 | B1 | * | 4/2002 | Krasnansky | .................. 326/82 |
| 6,856,352 | B1 | * | 2/2005 | Kijima | ........................ 348/312 |
| 7,129,985 | B1 | | 10/2006 | Koizumi et al. | |
| 2003/0043287 | A1 | | 3/2003 | Kakiuchi et al. | |
| 2003/0200473 | A1 | | 10/2003 | Fung | |
| 2003/0218690 | A1 | * | 11/2003 | Sakaegi | ....................... 348/372 |
| 2004/0120690 | A1 | * | 6/2004 | Takeshita et al. | .............. 386/46 |

FOREIGN PATENT DOCUMENTS

| JP | 57-29916 | 2/1982 |
|---|---|---|
| JP | 57-085110 | 5/1982 |
| JP | 63-246081 | 10/1988 |
| JP | 02-082774 | 3/1990 |

(Continued)

OTHER PUBLICATIONS

"TLC876M Analog-To-Digital Converters" Texas Instruments SLAS140E- Jul. 1997—Revised Oct. 2000.*

(Continued)

*Primary Examiner*—Lin Ye
*Assistant Examiner*—Hung Lam
(74) *Attorney, Agent, or Firm*—Fish & Richardson P.C.

(57) ABSTRACT

A signal processor for reducing power consumption. The signal processor includes a signal processing circuit and a first regulator connected to the signal processing circuit. The first regulator receives an external regulated voltage from an external regulator connected to the signal processor and generates an internal regulated voltage that is in accordance with an output level of a CCD image sensor. The signal processing circuit operates with the internal regulated voltage and performs a predetermined signal processing on an image signal generated by the CCD image sensor.

6 Claims, 5 Drawing Sheets

FOREIGN PATENT DOCUMENTS

| | | | |
|---|---|---|---|
| JP | 02-248170 | * | 3/1990 |
| JP | 02-248170 | * | 10/1990 |
| JP | 10-150766 | | 6/1998 |
| JP | 10-174048 | | 6/1998 |
| JP | 10-337001 | | 12/1998 |
| JP | 11-296241 | | 10/1999 |
| JP | 11-331682 | | 11/1999 |
| JP | 2000-224495 | | 8/2000 |

OTHER PUBLICATIONS

Bryan Ackland and Alex Dickinson (Camera on a Chip; IEEE Feb. 8, 1996-pp. 22-26).*

* cited by examiner

IMAGE SIGNAL PROCESSOR FOR USE WITH A SOLID-STATE IMAGING DEVICE

BACKGROUND OF THE INVENTION

The present invention relates to an image signal processor for performing a predetermined signal process on an image signal output from a solid-state imaging device to generate an image signal complying with a predetermined format.

An imaging apparatus using a solid-state imaging device (CCD image sensor), such as a digital still camera, often uses a battery as a power supply. The range of the output voltage of a battery is limited. Therefore, a regulator circuit or a booster circuit is employed to drive the CCD image sensor.

FIG. 1 is a schematic block diagram of a prior art imaging apparatus 50. The imaging apparatus 50 includes a regulator circuit 2, which is located at the input side. The regulator circuit 2, which is supplied with power supply voltage (e.g., 3.2V) from a battery, generates a predetermined regulated voltage VK (e.g., 2.9V). The imaging apparatus 50 has a signal processor 7, which includes a signal processing circuit 9 and an output circuit 14. The regulated voltage VK is set in accordance with the operational voltage of the output circuit 14. The operational voltage of the output circuit 14 is greater than that of the signal processing circuit 9.

The CCD image sensor 3 is, for example, a frame transfer type, and includes an imaging section 3a, a charge section 3b, a horizontal transfer section 3c, and an output section 3d. The imaging section 3a has a plurality of light receiving pixels for accumulating information charges generated in accordance with an imaging subject. The charge section 3b temporarily stores the information charges corresponding to a single screen image that is retrieved from the imaging section 3a. The horizontal transfer section 3c sequentially retrieves the information charges from the charge section 3b and sequentially transfers the information charges in the horizontal direction in units of single pixels. The output section 3d receives information charges from the horizontal transfer section 3c, converts the information charges in units of single pixels to voltage values corresponding to the information charges, and generates an image signal Y(t). The image signal Y(t) is provided to the signal processor 7.

The drive device 4 includes a booster circuit 5 and a vertical driver 6, which are formed on the same semiconductor substrate. The booster circuit 5 includes a positive voltage generating charge pump and a negative voltage generating charge pump. The positive voltage generating charge pump increases the regulated voltage VK (e.g., 2.9V) to a predetermined positive voltage VOH (e.g., 5V) and supplies the positive voltage VOH to the CCD image sensor 3. The negative voltage generating charge pump boosts the regulated voltage VK to a predetermined negative voltage VOL (e.g., −5V) and supplies the negative voltage VOL to the vertical driver 6.

The vertical driver 6 operates with the negative voltage VOL and generates a frame transfer clock signal Øf and a vertical transfer clock signal Øv. The clock signals Øf and Øv are respectively provided to the imaging section 3a and the charge section 3b of the CCD image sensor 3. The frame transfer clock signal Øf and the vertical transfer clock Øv are generated in accordance with a frame shift timing signal FT, a vertical synchronizing signal VT, and a horizontal synchronizing signal HT, which are provided from the timing control circuit 13 of the signal processor 7. The information charges that are accumulated in the imaging section 3a are frame-transferred to the charge section 3b at a timing that is in accordance with the frame shift timing signal FT. The information charges that are accumulated in the charge section 3b are line-transferred to the horizontal transfer section 3c at a timing that is in accordance with the vertical synchronizing, signal VT and the horizontal synchronizing signal HT.

A horizontal driver 8 operates with the regulated voltage VK and generates a horizontal transfer clock signal Øh. The horizontal transfer clock signal Øh is provided to the horizontal transfer section 3c of the CCD image sensor 3. The horizontal transfer clock signal Øh is generated in accordance with the vertical synchronizing signal VT and the horizontal synchronizing signal HT, which are provided from the timing control circuit 13. The information charges retrieved in the horizontal transfer section 3c are sequentially and horizontally transferred in single pixel units at a timing that is in accordance with the horizontal synchronizing signal HT and converted to an image signal Y(t) by the output section 3d.

The signal processing circuit 9, which includes an analog processing circuit 10, an A/D converter 11, and a digital processing circuit 12. The analog processing circuit 10 receives an image signal Y(t) from the CCD image sensor 3 and performs various types of analog signal processing, such as a sample and hold and gain adjustment. The A/D converter 11 receives an image signal, which has undergone an analog processing, converts the image signal (n) to a digital signal in single pixel units, and generates digital image data signal Y(n).

The digital processing circuit 12 performs a predetermined matrix processing on the digital image signal Y(n), generates luminance data and a chrominance data, performs processes such as contour correction and gamma correction on the luminance data, and generates image data signal Y'(n).

The timing control circuit 13, which operates with the regulated voltage VK supplied from the regulator circuit 2, divides a reference clock signal CK, which has a fixed cycle, and determines the vertical and horizontal scanning timing of the CCD image sensor 3. In accordance with the determined timing, the timing control circuit 13 generates the vertical synchronizing signal VT and the horizontal synchronizing signal HT. Further, the timing control circuit 13 generates the frame shift signal FT at a cycle coinciding with the cycle of the vertical synchronizing signal.

The output circuit 14 operates with the regulated voltage VK, receives the image data signal Y'(n) from the digital processing circuit 12 of the signal processing circuit 9, and provides the image data signal Y'(n) to external device including a central processing unit (CPU) 16, a memory 17, or a display driver 18 via a system bus 15. The CPU 16 centrally controls the operations of the imaging apparatus 50, the memory 17, and the display driver 18 in response to commands from peripheral devices. The memory 17 is a removable memory (e.g., a flash memory or memory card) or a fixed memory, such as a hard disk, and stores image data signal Y'(n), which is provided from the imaging apparatus 50. The display driver 18 receives the image data signal Y'(n) from the imaging apparatus 50, drives the display panel 19 to display a reproduced image.

In the signal processor 7 of the imaging apparatus 50, after the regulator circuit 2 regulates the power supply voltage VDD from the battery to the predetermined regulated voltage VK, every circuit of the signal processor 7 is commonly supplied with the regulated voltage VK. Thus, even though the power supply voltage, which is less that the regulated voltage VK, operates the signal processing circuit 9 the signal processing circuit 9 is supplied with the regulated voltage VK, which is greater than the operational voltage. As a result, the signal processing circuit 9 consumes unnecessary power. This may increase the power consumption of the imaging apparatus 50.

SUMMARY OF THE INVENTION

It is an object of the present invention to provide an imaging signal processor that reduces power consumption.

To achieve the above object, the present invention provides an image signal processor for performing a predetermined signal process on a first image signal, which is generated by a solid-state imaging device, and generating a second image signal, which is provided to an external device and complies with a predetermined format. The image signal processor includes a first regulator supplied with a power supply voltage, which is in accordance with an input level of the external device, to generate a first regulated voltage, which is in accordance with an output level of the solid-state imaging device. A signal processing circuit is connected to the solid-state imaging device and the first regulator and operates with the first regulated voltage. The signal processing circuit performs a predetermined signal processing on the first image signal and generates the second image signal. An output circuit is connected to the signal processing circuit and operates with the power supply voltage. The output circuit receives the second image signal from the signal processing circuit and provides the second image signal to the external device.

A further perspective of the present invention is an image signal processor for performing a predetermined signal process on a first image signal, which is generated by a solid-state imaging device, and generating a second image signal, which is provided to an external device and complies with a predetermined format. The image signal processor includes a first regulator supplied with a power supply voltage, which is in accordance with an input level of the external device, to generate a first regulated voltage, which is in accordance with an output level of the solid-state imaging device. An analog processing circuit is connected to the solid-state imaging device and operates with the power supply voltage. The analog processing circuit performs a predetermined analog signal processing on the first image signal. A digital processing circuit is connected to the first regulator and operates with the first regulated voltage. The digital processing circuit performs a predetermined digital signal processing on a digital first image signal converted from the first image signal, which has undergone the analog signal processing, to generate the second image signal. An output circuit is connected to the digital processing circuit and operates with the power supply voltage. The output circuit receives the second image signal from the signal processing circuit and provides the second image signal to the external device.

A further perspective of the present invention is a method for supplying power supply voltage to an image signal processor. The image signal processor includes a signal processing circuit for performing a predetermined signal processing on a first image signal, which is generated by a solid-state imaging device, to generate a second image signal, which complies with a predetermined format, and an output circuit for receiving the second image signal from the signal processing circuit and providing the second image signal to an external device. The method includes receiving the power supply voltage and generating a first regulated voltage that is in accordance with an output level of the solid-state imaging device, supplying the first regulated voltage to the signal processing circuit, receiving the power supply voltage and generating a second regulated voltage that is in accordance with an input level of the external device, and supplying the second regulated voltage to the output circuit.

A further perspective of the present invention is a method for supplying power supply voltage to an image signal processor. The image signal processor includes a signal processing circuit for performing a predetermined signal processing on a first image signal, which is generated by a solid-state imaging device, to generate a second image signal, which complies with a predetermined format, and an output circuit for receiving the second image signal from the signal processing circuit and providing the second image signal to an external device. The method includes receiving the power supply voltage and generating a first regulated voltage that is in accordance with an output level of the solid-state imaging device, supplying the first regulated voltage to the signal processing circuit, and supplying the power supply voltage to the output circuit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
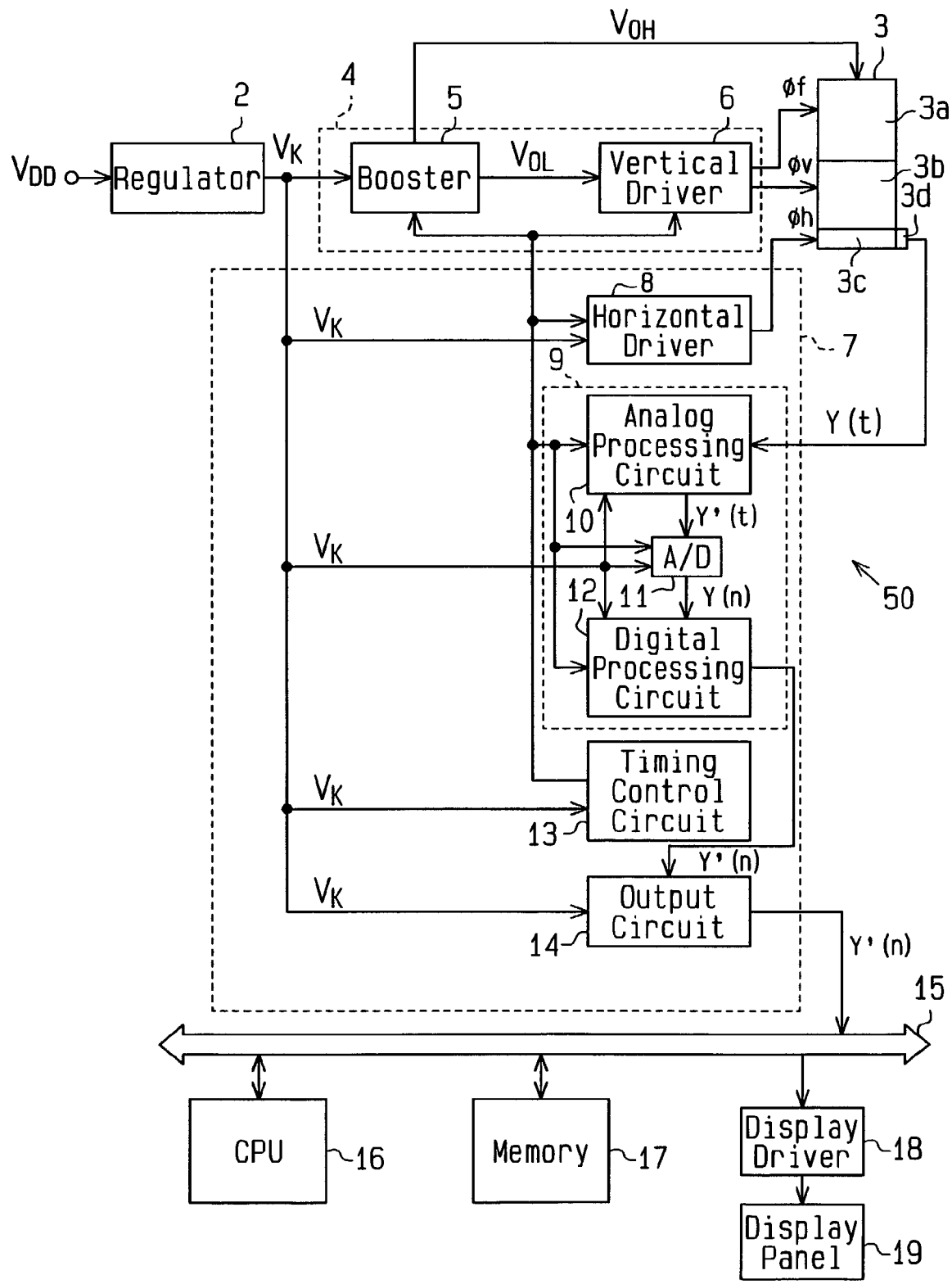
FIG. 1 is a schematic block diagram of a prior art imaging apparatus.

In the drawings, like numerals are used for like elements throughout.

Figure 2:
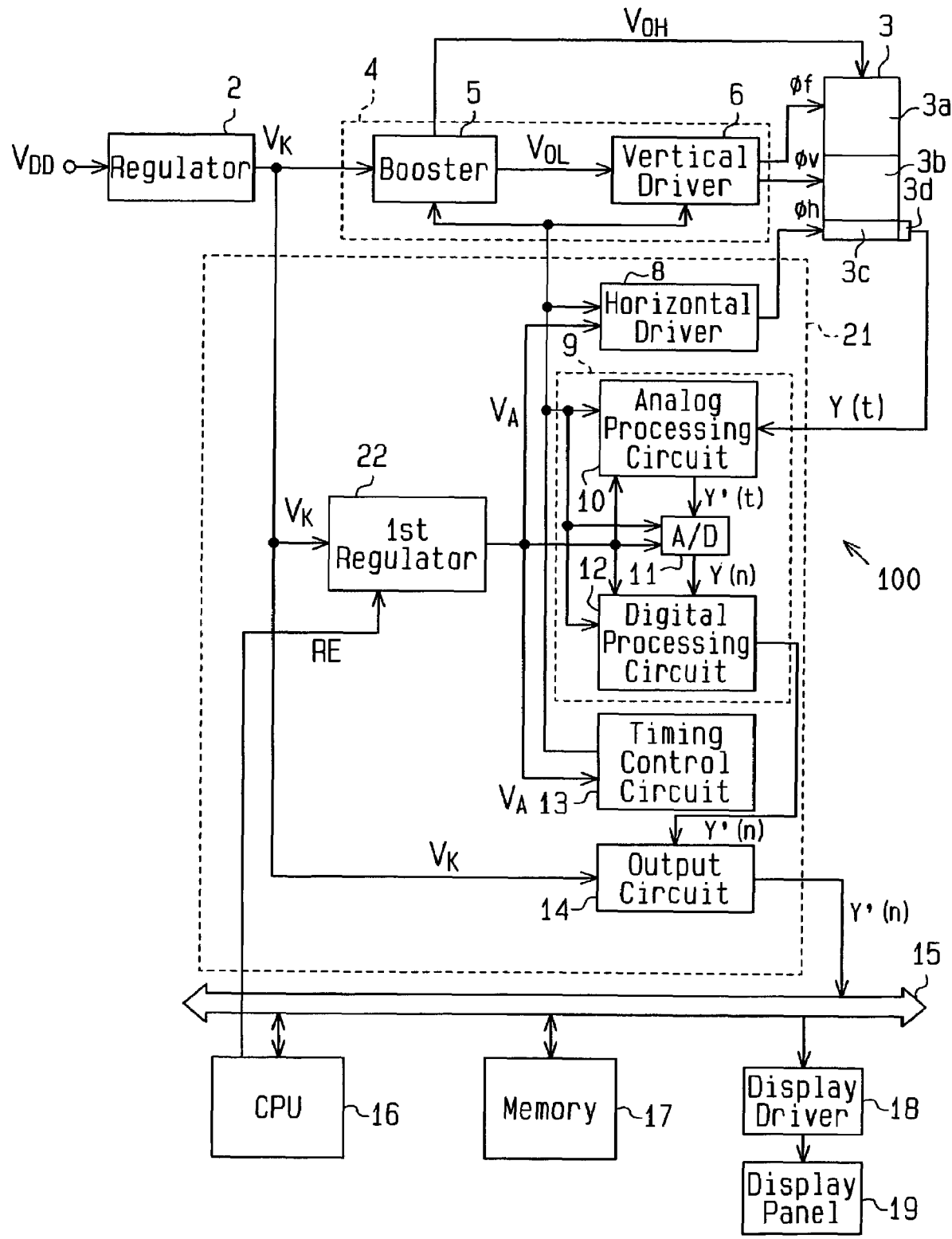
FIG. 2 is a schematic block diagram of an imaging apparatus including a signal processor according to a first embodiment of the present invention.

FIG. 2 is a schematic block diagram of an imaging apparatus 100 including an image signal processor 21 according to a first embodiment of the present invention. The signal processor 21 of the first embodiment includes a horizontal driver 8, a signal processing circuit 9, an output circuit 14, and a first regulator circuit 22. The present invention is characterized by the first regulator circuit 22, which independently supplies the signal processing circuit 9 with power supply voltage. The imaging apparatus 100 includes an external regulator circuit 2 arranged outside the signal processor 21. The external regulator circuit 2 generates a regulated voltage VK from the power supply voltage VDD. The signal processor 21 operates with the regulated voltage VK. The regulated voltage VK is set at the operational voltage of the output circuit 14 (e.g., 2.9V). In other words, the regulated voltage VK is set in accordance with an input level of external device connected to the output circuit 14 via a system bus 15.

The horizontal driver 8 operates with the regulated voltage VK and generates a horizontal transfer clock signal Øh. The horizontal transfer clock signal Øh is provided to a horizontal transfer section 3c of a CCD image sensor 3.

The signal processing circuit 9 includes an analog processing circuit 10, an A/D converter 11, and a digital processing circuit 12. The signal processing circuit 9 operates with a regulated voltage corresponding to an output level of the CCD image sensor 3 and performs a predetermined signal processing on the image signal output from the image sensor 3.

The analog processing circuit 10 receives the image signal Y(t) from the CCD image sensor 3 and performs analog signal processing, such as a correlated double sampling (CDS) process and an automatic gain control (AGC) process, on the image signal Y(t). In the CDS process, the image signal Y(t), which repeats the reset level and the signal level, is clamped at the reset level. Subsequently, the signal level is extracted from the image signal Y(t) and an image signal having a continuous signal level is generated. In the AGC process, the image signals retrieved in the CDS process are integrated in units of single image screens or single vertical scan terms. The gain is feedback-controlled so that the integrated data is included in a predetermined range. The A/D converter 11 receives an image signal from the analog processing circuit 10, standardizes the image signal in synchronism with the image output timing of the CCD image sensor, and generates a digital image data signal Y(n). The digital image data Y(n) is provided to the digital processing circuit 12.

The digital processing circuit 12 performs processes such as color separation and a matrix operation on the digital image signal Y(n) to generate an image data signal Y'(n), which includes a luminance signal and a chrominance signal. For example, in the color separation process, the digital processing circuit 12 separates the image data Y(n) in accordance with a color array of a color filter, which is attached to the imaging section 3a of the CCD image sensor 3, to generate a plurality of color component signals. In the matrix operation process, the digital processing circuit 12 generates the luminance signal by synthesizing the separated color components and generates the chrominance signal by subtracting luminance components from each color components.

The timing control circuit 13 includes a plurality of counters (not shown), which count a reference clock signal CK that has a constant cycle, and determines a vertical scan and horizontal scan timing of the CCD image sensor 3. The timing control circuit 13 divides the reference clock signal CK, which is provided via a clock supply terminal (not shown), to generate the frame timing signal FT, the vertical synchronizing signal VT, and the horizontal synchronizing signal HT. The timing control circuit 13 provides the analog processing circuit 10, the A/D converter 11, and the digital processing circuit 12 with a timing signal to synchronize the operations of the A/D converter 11 and the digital processing circuit 12 with the operational timing of the CCD image sensor 3.

The output circuit 14 operates with the regulated voltage VK, receives the image data signal Y'(n) from the digital processing circuit 12 of the signal processing circuit 9, and provides the image data signal Y'(n) to the system bus 15.

A first regulator circuit 22 is supplied with the regulated voltage VK from the external regulator circuit 2 and generates a first regulated voltage VA from the power supply voltage VDD. The first regulated voltage VA is set in accordance with the optimal operational voltage of the signal processing circuit 9 and is substantially equal to the output voltage level (i.e., voltage level of the image signal) (e.g., 2.0 to 2.5V).

The first regulator circuit 22 is operated in accordance with the operating state of the CCD image sensor 3. More specifically, a CPU 16 provides a control signal RE, which indicates the operating state of the CCD image sensor 3, to the first regulator circuit 22. When the control signal RE indicates a state in which the CCD image sensor 3 is not operating, the first regulator circuit 22 stops generating the first regulated voltage VA and lowers the output voltage to the ground voltage VG (e.g., 0V).

The stopping of the supply of power supply voltage to the signal processing circuit 9 is especially effective when the signal processor 21 operates using an external battery as a power source. When the power supply side does not have a means for cutting the supply of power from the battery, the signal processor 21 may be supplied with the power supply voltage even if the entire system, which includes the CCD image sensor 3 and the external device, is not operating. If the power supply voltage is supplied, this may cause a current leak in a circuit even if the signal processing circuit 9 and the output circuit 14 are not operating. This would result in power consumption. Accordingly, since the supply of power supply voltage from the battery is stopped when the CCD image sensor 3 and the external device stop operating, current leaks that occur at the signal processing circuit 9 is prevented. This avoids unnecessary power consumption. The first regulator circuit 22 may stop generating the regulated voltage during at least part of the time during which the CCD image sensor 3 stops operating.

The signal processor 21 operates in the following manner. When the power supply voltage VDD (e.g., 3.2V) is supplied from the battery, the external regulator circuit 2 receives the power supply voltage VDD and generates the regulated voltage VK, which substantially coincides with operational voltage (e.g., 2.9V) of the output circuit 14, from the power supply voltage VDD. The regulated voltage VK is supplied to the first regulator circuit 22 and the output circuit 14.

The first regulator circuit 22 converts the regulated voltage VK to a first regulated voltage VA (e.g., 2.0V to 2.5V), which is substantially the same as he operational voltage of the horizontal driver 8, the signal processing circuit 9 and the timing control circuit 13. The first regulated voltage VA is supplied to the circuits 10, 11, 12 of the signal processing circuit 9. A predetermined signal processing is performed on the image signal Y(t), which is output from the CCD image sensor 3, at a timing synchronized with the operation of the CCD image sensor 3. The output circuit 14 operates with the regulated voltage VK. The output circuit 14 provides the digital image signal Y'(n), which is processed by the signal processing circuit 9, to external device, which includes a CPU 16, a memory 17, or a display driver 18 via the bus 15.

In this manner, by providing the signal processing circuit 9 with the first regulator circuit 22, the signal processing circuit 9 is independently supplied with the power supply voltage. That is, the signal processing circuit 9 and the output circuit 14 are supplied with difference power supply voltages to reduce power consumption. Further, the first regulated voltage VA of the first regulator circuit 22 is set at the optimal voltage of the signal processing circuit 9. This improves the operational characteristics during signal processing.

The signal processor 21, which includes the first regulator circuit 22, the horizontal driver 8, the signal processing circuit 9, the timing control circuit 13, and the output circuit 14, is arranged on the same semiconductor substrate. Thus, the first regulator circuit 22 is manufactured simultaneously with the other circuits of the signal processor 21. This reduces cost and increases the manufacturing yield.

Figure 3:
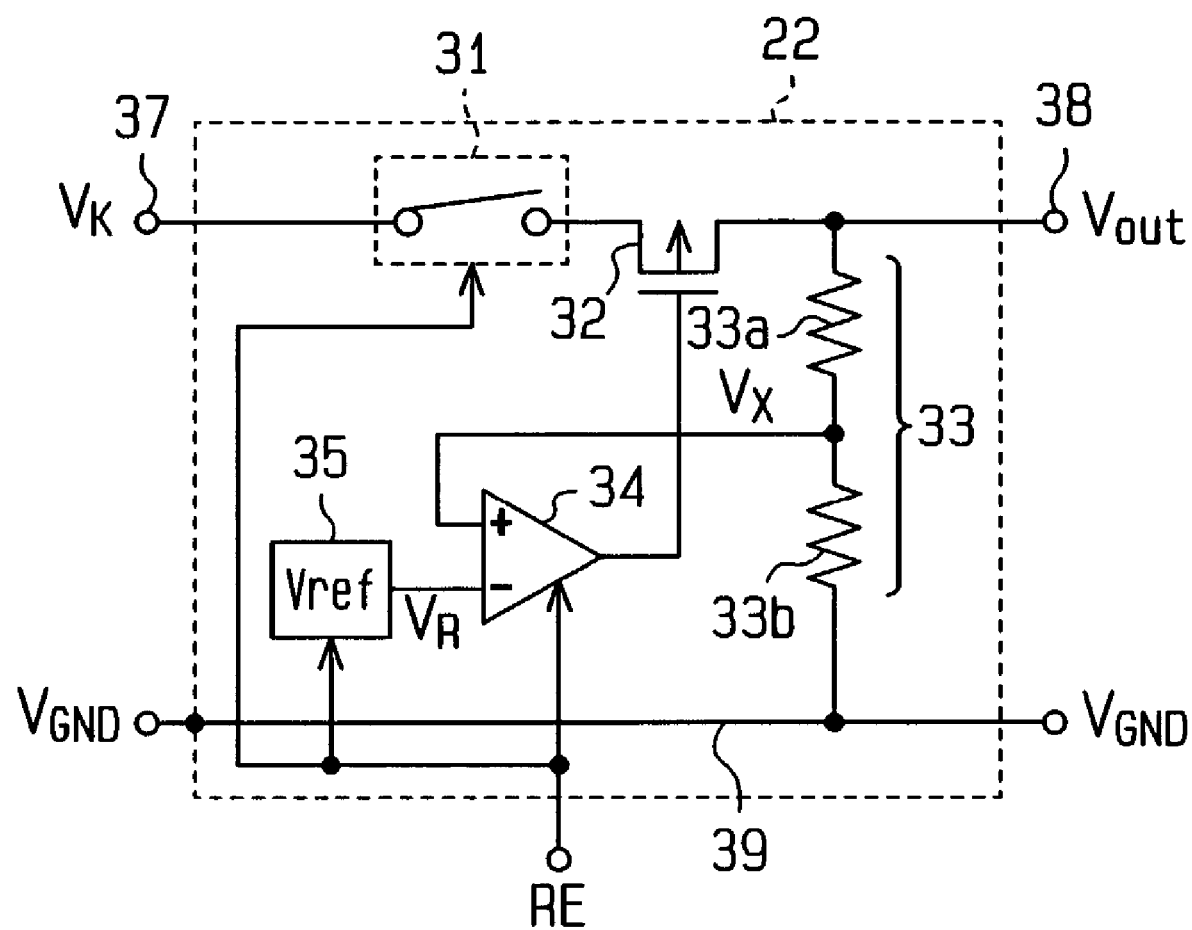
FIG. 3 is a schematic circuit diagram of a first regulator circuit employed in the signal processor of FIG. 2.

FIG. 3 is a schematic circuit diagram of the first regulator circuit 22. The first regulator circuit 22 includes a switch 31, a p-channel transistor 32, a resistor string 33, a comparator 34, and a reference voltage generation circuit 35.

The switch 31 is connected between a power supply terminal 37 and the p-channel transistor 32. The p-channel transistor 32 is connected between the switch 31 and the output terminal 38. The gate of the p-channel transistor 32 is connected to the output terminal of the comparator 34. The resistor string 33 includes resistors 33a, 33b, which are connected in series between the drain of the p-channel transistor 32 and the ground. The median point between the resistor 33a and the resistor 33b is connected to a non-inverting terminal of the comparator 34. The reference voltage generation circuit 35 is connected to an inverting input terminal of the comparator 34.

The first regulator circuit 22 operates in the following manner. The resistances of the resistor 33a and the resistor 33b are represented by R1 and R2. When the regulated voltage Vk is supplied via the power supply terminal 37, the p-channel transistor 32 goes on and the regulated voltage VK is supplied to the resistor string 33. The resistor string 33 divides the regulated voltage VK and generates a divided voltage VX=(R2/(R1+R2))·VK at the median point of the resistor string 33. The divided voltage VX is supplied to the non-inverting input terminal of the comparator 34.

Then, the comparator 34, which operates in accordance with the voltage difference between the divided voltage VX and the reference voltage VR, controls the ON resistance of the p-channel transistor 32 so that the divided voltage VX and the reference voltage VR are equalized. More specifically, when the divided voltage VX is greater than the reference voltage VR, the comparator 34 causes the p-channel transistor 32 to go ON. When the divided voltage VX is less than the reference voltage VR, the comparator 34 causes the p-channel transistor 32 to go OFF. The first regulator circuit 22 generates a constant voltage (regulated voltage) VOUT=((R1+R2)/R2)·VR based on the ratio of the resistances R1, R2 of the resistors 33a, 33b and the reference voltage VR of the reference voltage generation circuit 35.

In the first regulator circuit 22, the dividing ratio of the resistor string 33 and the reference voltage VR are set in accordance with the optimum functional voltage of the signal processing circuit 9. This generates an optimum regulated voltage for the signal processing circuit 9.

The switch 31, the comparator 34, and the reference voltage generation circuit 35 receive the control signal RE from the CPU 16 and operate in accordance with the operational state of the CCD image sensor 3. More specifically, when the level of the control signal RE corresponds to a state in which the CCD image sensor 3 is being used, the switch 31 connects the power supply terminal 37 and the p-channel transistor 32. The reference voltage generation circuit 35 generates the reference voltage VR, and the comparator 34 controls the ON resistance of the p-channel transistor 32 to equalize the divided voltage VX and the reference voltage VR. When the level of the control signal RE corresponds to a state in which the CCD image sensor is not operating, the switch 31 disconnects the power supply terminal 37 and the transistor 32. Thus, the comparator 34 and the reference voltage generation circuit 35 stop operating.

Since the first regulator circuit 22 stops operating when the CCD image sensor 3 is not operating, the amount of power consumed by the first regulator circuit 22 is decreased. This further reduces the power consumption of the signal processor 21.

Figure 4:
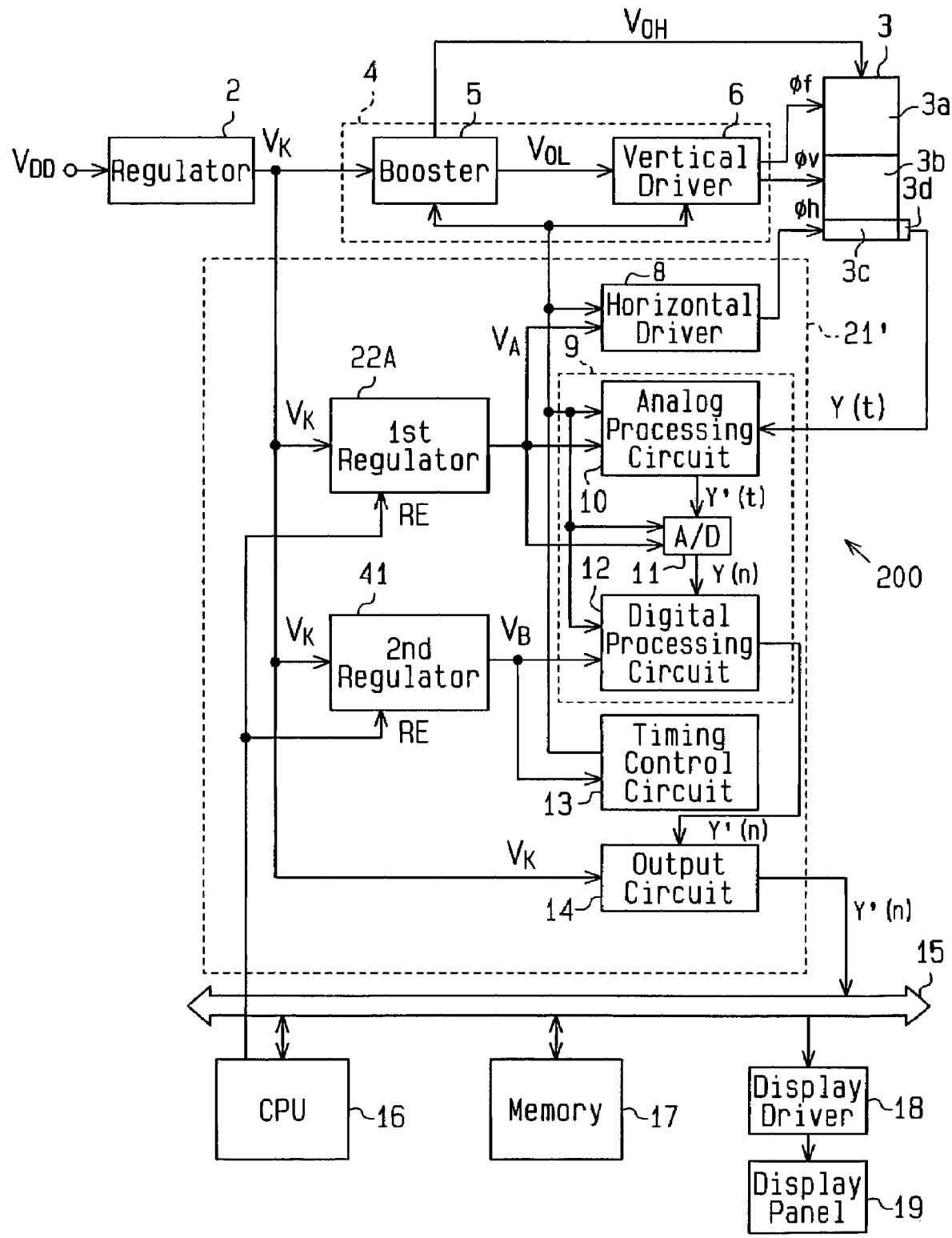
FIG. 4 is a schematic block diagram of an imaging apparatus including a signal processor according to a second embodiment of the present invention.

FIG. 4 is a schematic block diagram of an imaging apparatus 200 including a signal processor 21' according to a second embodiment of the present invention.

The signal processor 21' includes a horizontal driver 8, a signal processing circuit 9, a timing control circuit 13, an output circuit 14, a first regulator circuit 22A, and a second regulator circuit 41. The first regulator circuit 22A is connected to the horizontal driver 8, the analog processing circuit 10, and the A/D converter 11. The second regulator circuit 41 is connected to the output circuit 14.

The first regulator circuit 22A generates a voltage that is substantially equal to the optimum operational voltage of the analog processing circuit 10 and the A/D converter 11 (e.g., 2.5V). The first regulator circuit 22A, which is supplied with the regulated voltage VK from the external regulator circuit 2, generates the first regulated voltage VA.

The second regulator circuit 41 generates a voltage that is substantially equal to the optimum operational voltage of the digital processing circuit 12 and the timing control circuit 13 (e.g., 2.0V. The second regulator circuit 41, which is supplied with the regulated voltage VK from the external regulator circuit 2, generates a second regulated voltage VB, which is less than the first regulated voltage VA.

In the signal processor 21' of the second embodiment, the analog processing circuit 10 and the digital processing circuit 12 are provided with the first regulator circuit 22A and the second regulator circuit 41, respectively. Thus, the analog processing circuit 10 and the digital processing circuit 12 are each supplied with the optimal power supply voltage. This improves the operational characteristics for signal processing in the analog processing circuit 10 and the digital processing circuit 12. The second regulator circuit 41 generates the second regulated voltage VB, which is less than the first regulated voltage VA, and supplies the digital processing circuit 12 with the second regulated voltage VB. Since the digital processing circuit 12 is selectively supplied with the optimal power supply voltage from the second regulator circuit 41, the power consumption of the digital processing circuit 12 is reduced.

The configuration of the second regulator circuit 41 is substantially the same as the first regulator circuit 22 of FIG. 3. The dividing ratio of the resistor string 33 and the reference voltage VR of the reference voltage generation circuit 35 in the second regulator circuit 41 are set in accordance with the optimum operational voltage of the digital processing circuit 12. Further, the second regulator circuit 41 operates in accordance with the control signal RE. That is, when the control signal RE indicates a level corresponding to a state in which the CCD image sensor 3 is not operating, the first and second regulator circuits 22A, 41 stop generating the first and second regulated voltages VA, VB. Further, the reference voltage generation circuit 35 and the comparator 34 of the first and second regulator circuits 22A, 41 stop operating. When the signal processing circuit 9 is not operating, such control prevents power consumption caused by current leakage and prevents power consumption of the first and second regulator circuits 22A, 41.

Figure 5:
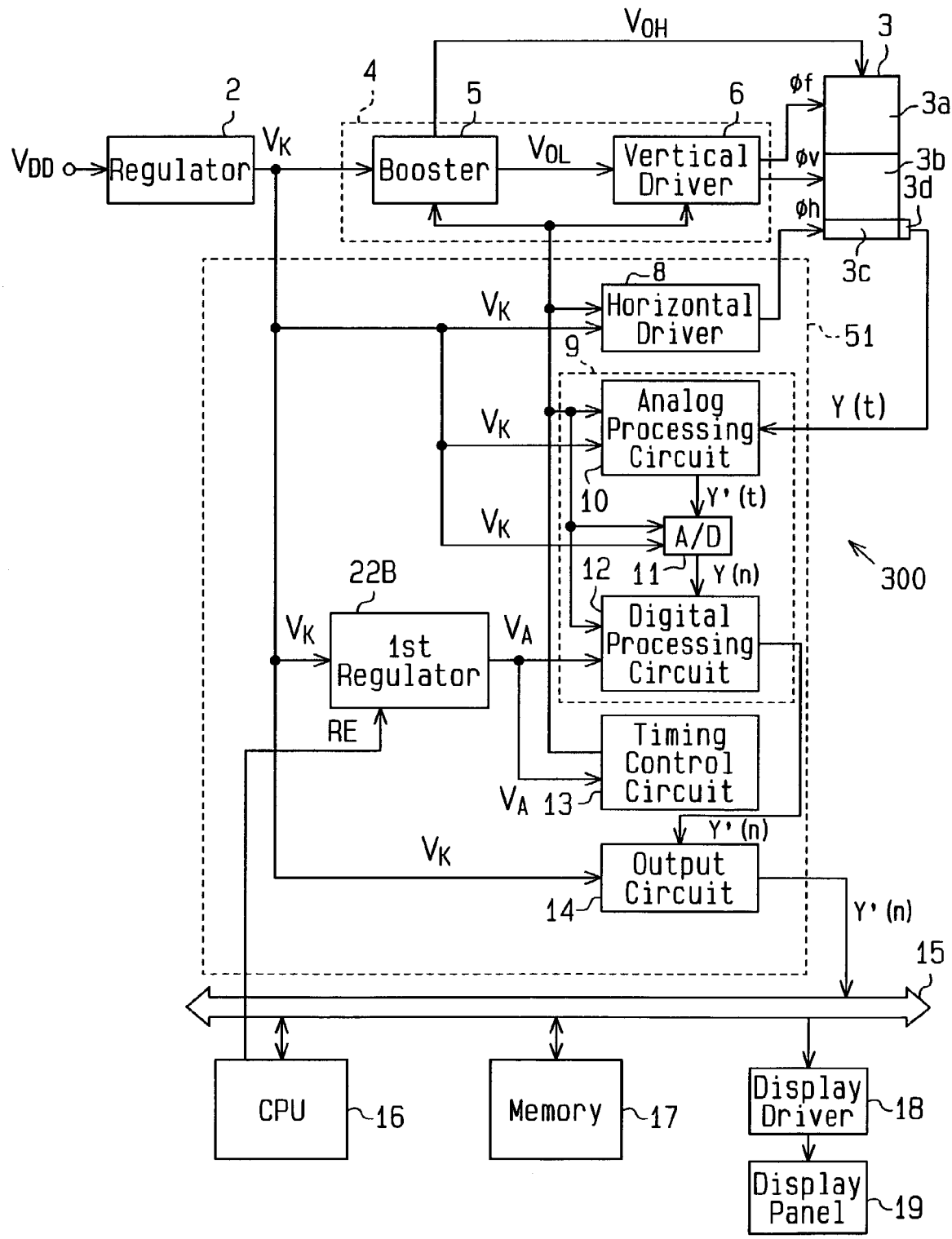
FIG. 5 is a schematic block diagram of an imaging apparatus including a signal processor according to a third embodiment of the present invention.

FIG. 5 is a schematic block diagram of an imaging apparatus 300 including a signal processor 51 according to a third embodiment of the present invention. The imaging apparatus 300 includes the external regulator circuit 2 of FIG. 2. The signal processor 51 does not have the first regulator circuit 22A of the second embodiment.

In the third embodiment, the regulated voltage VK of the external regulator circuit 2 is supplied to the horizontal driver 8, the analog processing circuit 10, and the A/D converter 11 in the signal processor 51 (e.g., 2.9V). Further, the signal processor 51 includes a first regulator circuit 22B (internal regulator circuit), which is supplied with the regulated voltage VK from the regulator circuit 2 and generates a first regulated voltage (e.g., 2.0V). The first regulated voltage VA is supplied to the digital processing circuit 12 and the timing control circuit 13.

In the third embodiment, the digital processing circuit 12 and the timing control circuit 13 are each supplied with the first regulated voltage VA, which is less than the regulated voltage VK and is optimal for the digital processing circuit 12 and the timing control circuit 13. Accordingly, the operating characteristics of the digital processing circuit 12 and the timing control circuit 13 are improved, and the power consumption of the signal processor 51 and the imaging apparatus 300 is reduced.

The first regulator circuit 22B operates in accordance with the control signal RE from the CPU 16. Accordingly, power is not consumed when the digital processing circuit 11 and the timing control circuit 13 are not operating.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. An image signal processor configured to process a first image signal that is generated by a solid-state imaging device, and to generate a second image signal having a format, the image signal processor comprising:
    a first regulator configured to receive a power supply voltage that corresponds to an input level of an external device, and to generate a first regulated voltage that is lower than the power supply voltage and that corresponds to an output level of the solid-state imaging device;
    a signal processing circuit configured to operate with the first regulated voltage, the signal processing circuit being configured to perform signal processing on the first image signal and to generate the second image signal;
    an output circuit configured to operate with the power supply voltage, the output circuit being configured to receive the second image signal and to forward the second image signal along a path to the external device;
    wherein the image signal processor is on a chip semiconductor substrate, and wherein the first regulator is configured to stop generating the first regulated voltage during at least part of a time when (i) the solid-state imaging device stops operating and (ii) the output circuit receives the power supply voltage; and
    a second regulator configured to receive the power supply voltage and to generate a second regulated voltage;
    wherein the signal processing circuit comprises:
        an analog processing circuit configured to operate with the first regulated voltage, the analog processing circuit being configured to perform analog signal processing on the first image signal; and
        a digital processing circuit configured to operate with the second regulated voltage, the digital processing circuit being configured to generate the second image signal by performing digital signal processing on a digital first image signal that corresponds to the first image signal after analog signal processing;
    wherein the second regulator is configured to stop generating the second regulated voltage during at least part of a time when (i) the solid-state imaging device stops operating and (ii) the output circuit receives the power supply voltage.

2. The image signal processor of claim 1, wherein the second regulated voltage is less than the first regulated voltage.

3. A method for supplying power supply voltage to an image signal processor on a chip semiconductor substrate, the method comprising:
    configuring a signal processing circuit to perform signal processing on a first image signal that is generated by a solid-state imaging device, and to generate a second image signal having a format;
    configuring an output circuit to receive the second image signal and to forward the second image signal along a path to an external device;
    configuring a first regulator to generate a first regulated voltage;
    wherein configuring the signal processing circuit comprises:
        configuring an analog processing circuit to operate with the first regulated voltage and to perform analog signal processing on the first image signal; and
        configuring a digital processing circuit to generate the second image signal by performing digital signal processing on a digital first image signal that corresponds to the first image signal after analog signal processing;
    receiving a first power supply voltage at the first regulator;
    using the first regulator to generate a first regulated voltage that is lower than the first power supply voltage and that corresponds to an output level of the solid-state imaging device;
    supplying the first regulated voltage to the signal processing circuit;
    receiving a second power supply voltage at a second regulator that is external to the image signal processor;
    using the second regulator to generate a second regulated voltage that corresponds to an input level of the external device;
    supplying the second regulated voltage to the output circuit, wherein the second regulated voltage is substantially same as the first power supply voltage; and
    stopping supply of the first regulated voltage and the second regulated voltage during at least part of a time when (i) the solid-state imaging device stops operating and (ii) the first power supply voltage is supplied to the output circuit.

4. A method for supplying power supply voltage to an image signal processor on a chip semiconductor substrate, the method comprising:
    configuring a signal processing circuit to perform signal processing on a first image signal that is generated by a solid-state imaging device, and to generate a second image signal having a format;

configuring an output circuit to receive the second image signal and to forward the second image signal along a path to an external device;

configuring a first regulator to generate a first regulated voltage;

wherein the signal processing circuit comprises:

configuring an analog processing circuit to operate with the first regulated voltage and to perform analog signal processing on the first image signal; and configuring a digital processing circuit to generate the second image signal by performing digital signal processing on a digital first image signal that corresponds to the first image signal after analog signal processing;

receiving the power supply voltage at the first regulator;

using the first regulator to generate a first regulated voltage that is lower than the power supply voltage and that corresponds to an output level of the solid-state imaging device;

supplying the first regulated voltage to the signal processing circuit;

supplying the power supply voltage to the output circuit;

receiving the power supply voltage at a second regulator;

using the second regulator to generate a second regulated voltage;

supplying the second regulated voltage to the digital processing circuit; and stopping supply of the first regulated voltage and the second regulated voltage during at least part of a time when (i) the solid-state imaging device stops operating and (ii) the power supply voltage is supplied to the output circuit.

5. The method of claim 4, further comprising:

generating the power supply voltage in accordance with an input level of the external device.

6. The method of claim 4, wherein the second regulated voltage is less than the first regulated voltage.

* * * * *